US012309558B2

(12) United States Patent

Vilermo et al.

(10) Patent No.: US 12,309,558 B2
(45) Date of Patent: May 20, 2025

(54) APPARATUS, METHOD AND COMPUTER PROGRAM FOR ENABLING AUDIO ZOOMING

(71) Applicant: Nokia Technologies Oy, Espoo (FI)

(72) Inventors: Miikka Tapani Vilermo, Siuro (FI); Hannu Juhani Pulakka, Pirkkala (FI); Roope Olavi Jarvinen, Lempaala (FI); Jorma Juhani Makinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 111 days.

(21) Appl. No.: 17/860,152

(22) Filed: Jul. 8, 2022

(65) Prior Publication Data

US 2023/0021379 A1 Jan. 26, 2023

(30) Foreign Application Priority Data

Jul. 13, 2021 (GB) ..................................... 2110058

(51) Int. Cl.
*H04R 3/00* (2006.01)
*H04R 1/40* (2006.01)
*H04R 29/00* (2006.01)

(52) U.S. Cl.
CPC ............. *H04R 3/005* (2013.01); *H04R 1/406* (2013.01); *H04R 29/005* (2013.01); *H04R 2430/01* (2013.01)

(58) Field of Classification Search
CPC ...... H04R 3/005; H04R 1/406; H04R 29/005; H04R 2430/01; H04R 2499/11; H04R 2430/20; G10L 21/0316; H04S 7/30; H03G 5/16; H03G 7/00
USPC ................ 381/2, 56, 58, 102, 104, 106, 365
See application file for complete search history.

(56) References Cited

U.S. PATENT DOCUMENTS

| | | | | |
|---|---|---|---|---|
| 2006/0188104 | A1* | 8/2006 | De Poortere | H03G 5/165 381/102 |
| 2011/0129095 | A1 | 6/2011 | Avendano et al. | 381/63 |
| 2013/0021503 | A1 | 1/2013 | Zurek et al. | 348/240.99 |
| 2021/0044896 | A1* | 2/2021 | Kim | G10L 21/0356 |

* cited by examiner

*Primary Examiner* — Paul Kim
(74) *Attorney, Agent, or Firm* — McCarter & English, LLP

(57) ABSTRACT

Examples of the disclosure relate to apparatus, methods and computer programs for enabling audio zooming. The apparatus can include circuitry configured for determining, for an audio signal, if sound energy in at least one first direction is different to sound energy in at least one second direction by at least a threshold amount. The circuitry may also be configured for controlling an amount of headroom provided based on whether or not sound energy in at least one first direction is different to the sound energy in at least one second direction by at least a threshold amount.

21 Claims, 5 Drawing Sheets

APPARATUS, METHOD AND COMPUTER PROGRAM FOR ENABLING AUDIO ZOOMING

TECHNOLOGICAL FIELD

Examples of the disclosure relate to an apparatus, method and computer program for enabling audio zooming. Some relate to an apparatus, method and computer program for enabling audio zooming while maintaining signal levels.

BACKGROUND

Audio zoom is an audio operation where sound sources in one or more directions can be amplified compared to sound sources in other directions. This can be achieved using two or more microphones and beamforming.

BRIEF SUMMARY

According to various, but not necessarily all, examples of the disclosure there is provided an apparatus comprising means for:

determining, for an audio signal, if sound energy in at least one first direction is different to sound energy in at least one second direction by at least a threshold amount; and controlling an amount of headroom provided based on whether or not sound energy in at least one first direction is different to the sound energy in at least one second direction by at least a threshold amount.

The first direction may be within a region of interest and the second direction may be outside of the region of interest.

The amount of headroom provided may be controlled so as to enable audio zooming.

If the sound energy in the at least one second direction is not different to the sound energy by at least the threshold amount then the amount of headroom may be controlled to be large enough to enable amplification of the audio signal when audio zooming is selected.

If the sound energy in the at least one second direction is different to the sound energy by at least the threshold amount then the amount of headroom may be controlled to not be large enough to enable amplification of the audio signal when audio zooming is selected.

If the headroom provided is not large enough to enable amplification of the audio signal when audio zooming is selected the apparatus may be configured to enable audio zooming by attenuation of unwanted sound sources.

The means may be for detecting a change in whether or not the sound energy in the at least one first direction is higher than sound energy in the least one second direction by at least the threshold amount and adjusting the headroom provided based on the detected change.

The amount of headroom provided may be controlled by using automatic gain control.

The amount of headroom provided may be controlled by the compression used.

The sound energy may be measured as a sum of a beamformed signal.

The means may be for determining, for an audio signal, if sound energy in at least one first direction is higher than sound energy in at least one second direction by at least a threshold amount.

According to various, but not necessarily all, examples of the disclosure there is provided an apparatus comprising at least one processor; and at least one memory including computer program code, the at least one memory and the computer program code configured to, with the at least one processor, cause the apparatus at least to perform:

determining, for an audio signal, if sound energy in at least one first direction is different to sound energy in at least one second direction by at least a threshold amount; and controlling an amount of headroom provided based on whether or not sound energy in at least one first direction is different to the sound energy in at least one second direction by at least a threshold amount.

According to various, but not necessarily all, examples of the disclosure there is provided an electronic device comprising an apparatus as described herein.

According to various, but not necessarily all, examples of the disclosure there is provided a method comprising:

determining, for an audio signal, if sound energy in at least one first direction is different to sound energy in at least one second direction by at least a threshold amount; and controlling an amount of headroom provided based on whether or not sound energy in at least one first direction is different to the sound energy in at least one second direction by at least a threshold amount.

According to various, but not necessarily all, examples of the disclosure there is provided a computer program comprising computer program instructions that, when executed by processing circuitry, cause:

determining, for an audio signal, if sound energy in at least one first direction is different to sound energy in at least one second direction by at least a threshold amount; and controlling an amount of headroom provided based on whether or not sound energy in at least one first direction is different to the sound energy in at least one second direction by at least a threshold amount.

BRIEF DESCRIPTION

Some examples will now be described with reference to the accompanying drawings in which.

DETAILED DESCRIPTION

Examples of the disclosure relate to apparatus, methods and computer programs for enabling audio zooming. The audio zooming can enable sounds within a region of interest to be amplified compared to sounds outside of the region of interest. Audio zoom could be used together with a camera zoom. In such examples the region of interest could be the field of view of the camera or a section of the field of view of the camera. In order to enable effective audio zooming the amount of headroom provided in the audio signals can be controlled based on the types of processing that are to be used to implement the audio zooming. The types of processing that are used to implement the audio zooming can be determined by whether or not there are any loud sound sources outside of the region of interest.

Figure 1:
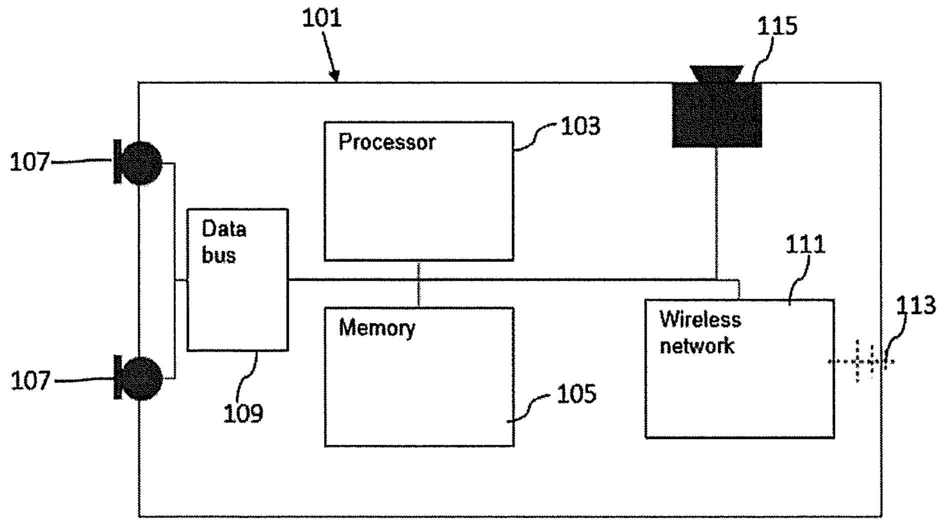
FIG. 1 shows an electronic device.

FIG. 1 schematically shows an electronic device 101 according to examples of the disclosure. The electronic device 101 could be used to implement examples of the disclosure. The electronic device 101 comprises a processor 103, a memory 105, two or more microphones 107, a data bus 109, a wireless network module 111, a transceiver 113 and a camera 115. Only components that are referred to in the following description are shown in FIG. 1. The electronic device 101 could comprise additional components that are not shown in FIG. 1. For example, the electronic device 101 could comprise a user interface, a power source and/or any other suitable component.

The electronic device 101 can be a user electronic device 101. In some examples the electronic device 101 could be a hand-held electronic device 101. In some examples the electronic device 101 could be a communications device. The electronic device 101 could be a mobile telephone, a tablet computer or any other suitable type of electronic device 101.

The processor 103 and the memory 105 can provide an apparatus such as a controller apparatus. An example processor 103 and memory 105 are shown in more detail in FIG. 2.

The electronic device 101 comprises two or more microphones 107. The microphones 107 can comprise any means that can be configured to capture sound and enable a microphone audio signal to be provided. The microphones 107 can comprise omnidirectional microphones. The microphone audio signals comprise an electrical signal that represents at least some of the sound field captured by the microphones 107.

In the example shown in FIG. 1 the electronic device 101 comprises two or more microphones 107. The microphones 107 can be provided at different positions within the electronic device 101 to enable spatial audio signals to be captured. In some examples the microphones 107 can be provided at different positions within the electronic device 101 so that the positions of one or more sound sources relative to the electronic device 101 can be determined based an audio signals captured by the microphones 107.

The microphones 107 are coupled to the processor 103 and the memory 105 so that the microphone audio signals are provided to the processor 103 for processing. In the example of FIG. 1 the microphones 107 are coupled to the processor 103 and memory 105 via a data bus 109. Other means for transferring signals between the microphones 107 and the processor 103 and memory 105 could be used in other examples of the disclosure.

The processing performed by the processor 103 can comprise enabling audio zooming, locating sound sources and/or any other suitable processing. The processing could comprise methods as shown in any of FIGS. 3 to 5 and/or any other suitable processing.

The camera 115 can comprise any means that can enable images to be captured. The images could comprise video images, still images or any other suitable type of images. The images that are captured by the camera 115 can accompany the microphone audio signals from the two or more microphones 107. The camera 115 can be controlled by the processor 103 to enable images to be captured.

In some examples of the disclosure the electronic device 101 can be used to capture audio signals to accompany images captured by the camera 115. In such examples if a user zooms in on the camera 115 or on images captured by the camera this could also cause audio zooming. The audio zooming could amplify the sound sources that are within the images captured by the camera 115. The sound sources that are within the images captured by the camera 115 can be determined based on the field of view of the camera 115, the amount of zoom used by the camera 115 and the locations of the one or more sound sources. The effective amplification of the sound sources within the images captured by the camera can be achieved by amplifying the wanted sound sources and/or by attenuating unwanted sound sources.

In the example shown in FIG. 1 the electronic device 101 comprises a wireless network module 111 and a transceiver 113. The wireless network module 111 and a transceiver 113 can be configured to enable data to be transmitted from the electronic device 101 and data to be transmitted to the electronic device 101. The data that is transmitted from the electronic device 101 can comprise audio signals from the microphone 107, processed audio signals, images from the camera 115 and or any other suitable data.

Figure 2:
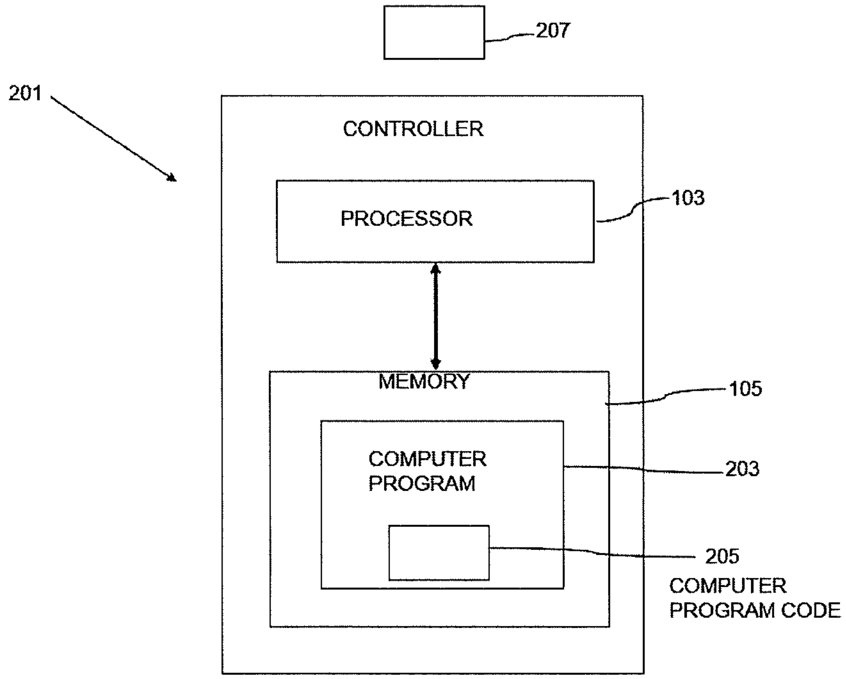
FIG. 2 shows an apparatus.

FIG. 2 shows an apparatus 201 comprising a processor 103 and a memory 105. The apparatus 201 could be provided within the electronic device 101 as shown in FIG. 1. The apparatus 201 could provide a control apparatus 201 for controlling the electronic device 101.

The apparatus 201 illustrated in FIG. 2 can be a chip or a chip-set. The apparatus 201 comprises a processor 103 and a memory 105. The processor 103 and memory 105 can be implemented as circuitry, in hardware, or can be a combination of hardware and software (including firmware).

In some examples the apparatus 201 can be implemented using instructions that enable hardware functionality, for example, by using executable instructions of a computer program 203 in a general-purpose or special-purpose processor 103 that can be stored on a computer readable storage medium (disk, memory etc.) to be executed by such a processor 103.

The processor 103 is configured to read from and write to the memory 105. The processor 103 can also comprise an output interface via which data and/or commands are output by the processor 103 and an input interface via which data and/or commands are input to the processor 103.

The memory 105 is configured to store a computer program 203 comprising computer program instructions (computer program code 205) that controls the operation of the apparatus 201 when loaded into the processor 103. The computer program instructions, of the computer program 203, provide the logic and routines that enable the apparatus 201 to perform the methods illustrated in FIGS. 3, 4 and 5. The processor 103 by reading the memory 105 is able to load and execute the computer program 203.

The apparatus 201 therefore comprises: at least one processor 103; and at least one memory 105 including computer program code 205, the at least one memory 105 and the computer program code 205 configured to, with the at least one processor 103, cause the apparatus 201 at least to perform:

- determining, for an audio signal, if sound energy in at least one first direction is different to sound energy in at least one second direction by at least a threshold amount; and
- controlling an amount of headroom provided based on whether or not sound energy in at least one first direction is different to the sound energy in at least one second direction by at least a threshold amount.

As illustrated in FIG. 2 the computer program 203 can arrive at the apparatus 201 via any suitable delivery mechanism 207. The delivery mechanism 207 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 203. The delivery mechanism can be a signal configured to reliably transfer the computer program 203. The apparatus 201 can propagate or transmit the computer program 203 as a computer data signal. In some examples the computer program 203 can be transmitted to the apparatus 201 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 203 comprises computer program instructions for causing an apparatus 201 to perform at least the following:

determining, for an audio signal, if sound energy in at least one first direction is different to sound energy in at least one second direction by at least a threshold amount; and controlling an amount of headroom provided based on whether or not sound energy in at least one first direction is different to the sound energy in at least one second direction by at least a threshold amount.

The computer program instructions can be comprised in a computer program 203, a non-transitory computer readable medium, a computer program product, a machine readable medium. In some but not necessarily all examples, the computer program instructions can be distributed over more than one computer program 203.

Although the memory 105 is illustrated as a single component/circuitry it can be implemented as one or more separate components/circuitry some or all of which can be integrated/removable and/or can provide permanent/semi-permanent/dynamic/cached storage.

Although the processor 103 is illustrated as a single component/circuitry it can be implemented as one or more separate components/circuitry some or all of which can be integrated/removable. The processor 103 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 3:
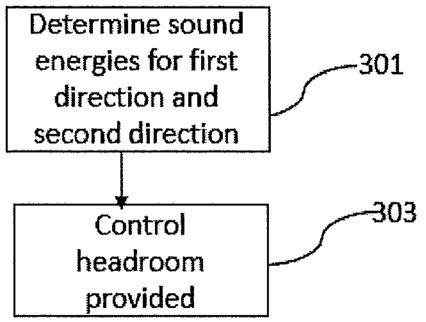
FIG. 3 shows a method.
Figure 4:
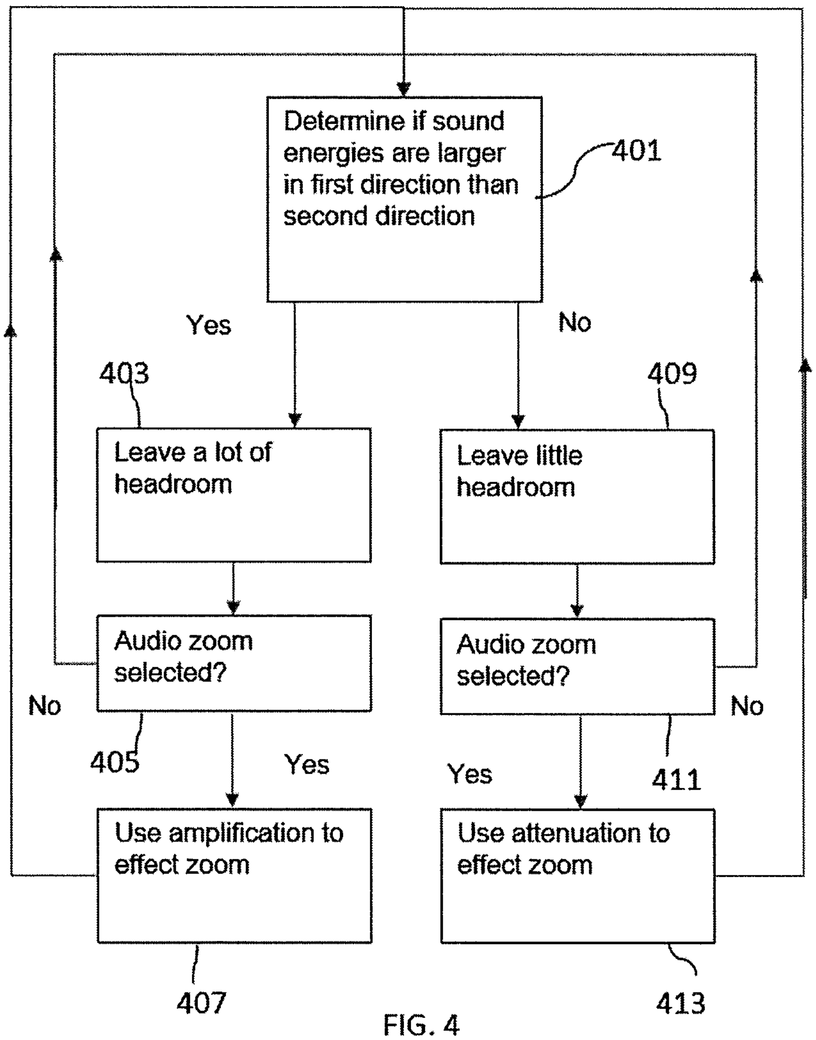
FIG. 4 shows a method.
Figure 5:
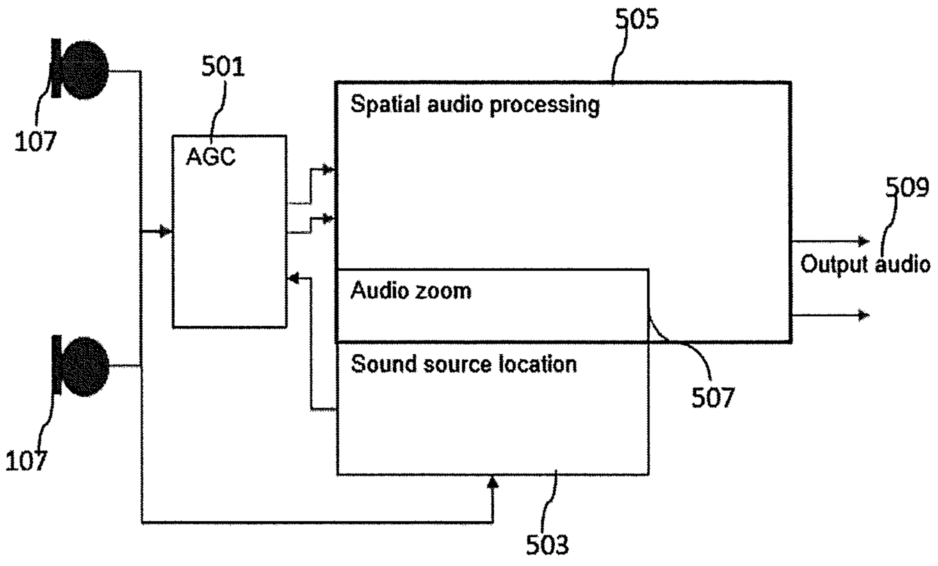
FIG. 5 shows a method.

The blocks illustrated in FIGS. 3, 4 and 5 can represent steps in a method and/or sections of code in the computer program 203. The illustration of a particular order to the blocks does not necessarily imply that there is a required or preferred order for the blocks and the order and arrangement of the block can be varied. Furthermore, it can be possible for some blocks to be omitted.

FIG. 3 shows an example method according to examples of the disclosure. The method could be implemented using an apparatus 201 and/or electronic device 101 as described above or using any other suitable type of electronic device or apparatus.

At block 301 the method comprises determining, for an audio signal, if sound energy in at least one first direction is different to the sound energy in at least one second direction by at least a threshold amount. For example, the method can comprise determining if sound energy in at least one first direction is higher than the sound energy in at least one second direction by at least a threshold amount.

The first direction and the second direction can be selected so that the first direction is within a region of interest and the second direction is outside of the region of interest. For example, the first direction could be within the field of view of a camera and the second direction could be outside of the field of view of camera. The sound sources in the first direction could therefore be wanted sound sources that a user might want to listen to. For example, sound sources in the first direction could correspond to images captured by the camera 115. The sound sources in the second direction could be unwanted sound sources that user might not want to listen to. For example, these could comprise sound sources that are not in the field of view of the camera 115.

The first direction and the second direction can change depending upon the orientation of the camera 115, the level of zoom used by the camera 115 and/or any other suitable factor.

At block 303 the method comprises controlling an amount of headroom provided based on whether or not sound energy in at least one first direction is different to the sound energy in at least one second direction by at least a threshold amount. For example, the amount of headroom provided can be controlled based on whether or not sound energy in at least one first direction is higher than the sound energy in at least one second direction by at least a threshold amount.

Any suitable means can be used to measure the sound energy in the respective directions. In some examples the sound energy can be measured as a sum of a beamformed signal.

The amount of headroom provided can be controlled so as to enable audio zooming. The amount of headroom provided can be controlled so as to enable audio zooming while maximizing, or substantially maximising, signal levels.

If sound energy in the first direction is significantly higher than the sound energy in the second direction this indicates that the loudest sounds are wanted sounds. For example, the loudest sounds could come from sound sources that are within the field of view of the camera 115.

If sound energy in the first direction is not significantly higher than the sound energy in the second direction this indicates that at least some of the loudest sounds could be unwanted sounds. For example, there could be some loud sound sources that are not located within the field of view of the camera 115.

If the loudest sounds are wanted sounds then the audio zooming can be implemented by using amplification or other suitable processes. In order to allow for the amplification sufficient headroom has to be provided within the signal. Therefore, if the loudest sounds are wanted sounds then the amount of headroom can be controlled so that a large amount of headroom is provided. The large amount of headroom is large enough so as to enable amplification of the audio signal if audio zooming is selected. In some examples the headroom could be around 12 dB. This amount of headroom can enable a clear change in the audio when the user selects audio zooming. This enables a user to clearly perceive that audio zooming has been used.

If the loudest sounds are unwanted sounds then the audio zooming can be implemented by using attenuation of the unwanted sound sources or other suitable processes. The attenuation will not use headroom and so, if the loudest sounds are unwanted sounds then the headroom can be controlled so that a small amount of headroom is provided. The small amount of headroom might not be large enough to enable amplification of the audio signals when audio zooming is selected, however this could maximise, or substantially maximise, signal levels. For example, the small amount of headroom could be much less than 12 dB. Using the small amount of headroom can maximise the loudness of the audio signal.

In some examples the apparatus 201 can be configured to detect a change in whether or not the sound energy in the at least one first direction is higher than sound energy in the least one second direction by at least the threshold amount. For example, the apparatus 201 could detect if one or more of the sound sources has moved, or if the loudness of any of the sound sources has changed or any other suitable factor.

If a change in whether or not the sound energy in the at least one first direction is higher than sound energy in the least one second direction by at least the threshold amount is detected then the apparatus 201 can be configured to adjust the headroom provided based on the detected change. For example, if it is detected that the sound sources have changed so that the loudest sound source is now an unwanted sound source then the headroom can be decreased. Conversely if it is detected that the sound sources have changed so that the loudest sound source is now a wanted sound source then the headroom can be increased.

Any suitable means can be used to control the amount of headroom provided. In some examples the amount of headroom provided can be controlled by using automatic gain control. In some examples the amount of headroom provided can be controlled by using different types of compression.

FIG. 4 shows another example method that could be used in some examples of the disclosure. This method could be implemented using an electronic device 101 as shown in FIG. 1 and/or an apparatus 201 as shown in FIG. 2.

The method comprises, at block 401, analysing a sound signal to determine if sound energies in a first direction are larger than sound energies in a second direction. The first direction can comprise a region of interest and the second direction can comprise one or more directions outside of the region of interest. At block 401 it can be determined if the sound energies in the first direction are larger than the sound energies in the second direction by at least a threshold amount. The threshold amount can be determined by the processing that is to be used for the audio zooming or any other suitable factor.

If the sound energies in the first direction are larger than the sound energies in the second direction by at least the threshold amount then this indicates that the sound sources in the region of interest are the dominant sound sources. If this is the case then, at block 403 the method comprises controlling the amount of headroom provided in the audio file so as to leave a lot of headroom.

Leaving a lot of headroom can comprise leaving sufficient headroom to enable implementing audio zooming by using amplification. In some examples the headroom could be around 12 dB.

Any suitable means can be used to control the amount of headroom that is provided. The amount of headroom provided can be controlled by controlling an algorithm such as automatic gain control and/or by using appropriate compression and/or by using any other suitable means.

At block 405 it is determined whether or not audio zoom is selected. A user of the electronic device 101 could select audio zoom by making an input using a user interface of the electronic device 101 or by any other suitable means. For instance, a user could be zooming images captured by the camera 115 which could also cause audio zooming.

If audio zoom is selected then, at block 407, the audio zoom is implemented using a process that comprises amplification. The process can comprise amplification of the wanted sound sources. This amplification can make use of the headroom that is provided within the audio file.

If the sound energies in the first direction are not larger than the sound energies in the second direction by at least the threshold amount then this indicates that the sound sources in the region of interest are not the dominant sound sources. For instance, there could be some loud sound sources that are not in the region of interest or there could be a lot of background noise. If this is the case then, at block 409 the method comprises controlling the amount of headroom provided to leave little headroom in the audio file.

Leaving little headroom can comprise leaving insufficient headroom to enable implementing audio zooming by using amplification. Leaving little headroom can comprise leaving much less headroom compared to the cases when a lot of headroom is left. For, example the headroom provided could be much less than 12 dB.

Any suitable means can be used to control the amount of headroom that is provided. The amount of headroom provided can be controlled by controlling an algorithm such as automatic gain control and/or by using appropriate compression and/or by using any other suitable means.

At block 411 it is determined whether or not audio zoom is selected. As described above a user of the electronic device 101 could select audio zoom by making an input using a user interface of the electronic device 101 or by any other suitable means. For instance, a user could be zooming images captured by the camera 115 which could also cause audio zooming.

If audio zoom is selected then, at block 413, the audio zoom is implemented using attenuation. The attenuation does not need to make use of any headroom. The attenuation could comprise attenuating the unwanted sound sources. The attenuation could comprise attenuating the sound sources that are in the second direction.

Once the audio zoom has been implemented the process returns, or if it is determined that audio zoom has not been selected then the method returns to block 401 and the audio signals are analysed to determine, for a different time period, whether or not the sound energies are louder in the first direction than the second direction. This can enable changes in the sound sources to be detected.

In examples of the disclosure, such as the method shown in FIG. 4, the process that is to be used to implement the zoom is determined before the user has selected the audio zoom. That is, if at block 403, a lot of headroom is left the audio zoom can be implemented using amplification or if, at block 409, little head room is left then the audio zoom can be implemented using attenuation. This can enable any switch between the different types of processing to be implemented gradually. This can reduce artefacts caused when switching between the different types of processing.

FIG. 5 shows another example method that could be implemented using an electronic device 101 as shown in FIG. 1 and/or an apparatus 201 as shown in FIG. 2.

In the example of FIG. 5 a plurality of microphones 107 capture a sound scene. Two microphones 107 are shown in FIG. 5 however, more than two microphones 107 could be provided in other examples of the disclosure.

The plurality of microphones 107 provide audio signals to an audio gain control (ACG) module 501 and also to a sound source location module 503.

The sound source location module 503 can be configured to determine the location of one or more sound sources. The sound source location 503 module can determine whether sound sources are within a region of interest or outside of a region of interest. For example, the sound source location module can determine whether or not a sound source is within a field of view of a camera 115 or outside of a field of view of a camera 115.

The sound source location module 503 can also be configured to determine the relative sound energies of the different sound sources and determine whether or not sound sources within the region of interest are significantly louder than sound sources outside of the region of interest. This provides an indication as to whether or not the dominant sound sources are wanted sound sources or unwanted sound sources.

The sound source location module 503 can also be configured to determine the amount of headroom that is to be provided. For instance, if it is determined that wanted sound sources are the dominant sound sources then a large amount of headroom can be provided. If it is determined that unwanted sound sources are the dominant sound sources then a small amount of headroom can be provided. The sound source location module 503 provides a control signal to the AGC module 501 indicating the amount of headroom that is to be provided within the audio file.

The ACG module 501 is configured to receive the audio signals from the microphones 107 and the input signal from the sound source location module 503 indicating the amount of headroom that is to be provided.

The ACG module 501 can be configured to control the level of the audio signals from the microphones 107. The ACG module 501 can control the level of the audio signals so that they are set at a level which is comfortable for a user to listen to. The ACG module 501 can use the input signal from the sound source location module 503 to control the amount of headroom that is provided.

The signals from the ACG module 501 are provided to a spatial audio processing module 505. The spatial audio processing module can process the audio signals to provide spatial audio output. The spatial audio output can comprise an output so that a user can perceive special effects of the audio when the spatial audio output is rendered and played back to a user.

Any suitable process can be used to generate the spatial audio output. The process for generating the spatial audio output can also comprise an audio zoom module 507 that can be configured to enable audio zooming. The audio zoom module 507 can indicate whether the audio zooming can be implemented by amplification of the wanted sound sources or by attenuation of the unwanted sound sources or by any other suitable process.

Once the spatial audio has been generated an output audio signal 509 is provided. The output audio signal 509 comprises the spatial audio signals. The headroom provided in the audio file comprising the output audio signal 509 is provided based on whether or not the dominant sound sources are wanted sound sources or unwanted sound sources and the processes used to implement the audio zooming.

Figure 6:
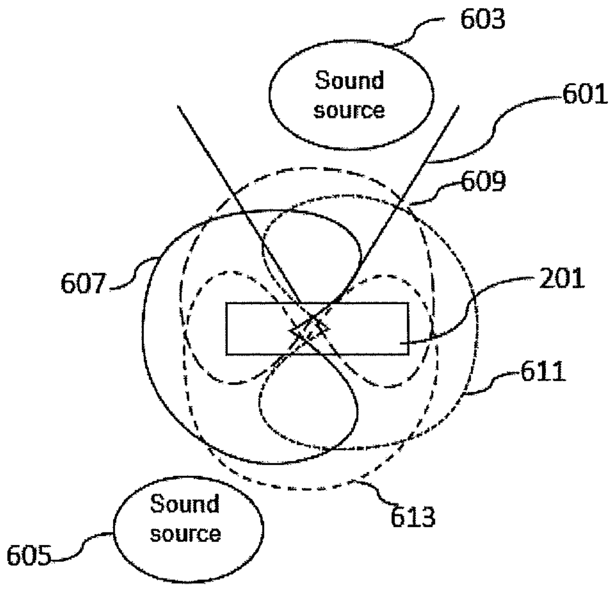
FIG. 6 shows examples sound sources.

FIG. 6 shows example sound sources 603, 605 positioned relative to an electronic device 201.

In the example of FIG. 6 the electronic device 101 has a region of interest 601. The region of interest could be the field of view of a camera 115, part of the field of view of the camera 115, a region around a microphone being used for audio calls or any other suitable region.

In FIG. 6 two sound sources 603, 605 are in the environment around the electronic device 101. The first sound source 603 is positioned within the region of interest 601. The first sound source 603 can therefore be a wanted sound source.

The second sound source 605 is positioned outside of the region of interest 601. The second sound source 605 can therefore be an unwanted sound source. In this example the second sound source 605 is positioned toward the rear of the electronic device 101. The second sound source 605 is provided on the opposite side of the electronic device 101 to the first sound source 603 and the region of interest 601.

In the example of FIG. 6 both of the sound sources 603, 605 are shown as the same size indicating that they have the same or similar loudness. In examples of the disclosure the electronic device 101 and/or an apparatus 201 within the electronic device 101 can be configured to compare the loudness of the sound sources 603, 605 and determine whether or the wanted sound sources 603 are the dominant sound sources.

FIG. 6 also shows a plurality of beamformer patterns 607. 609, 611. 613 that can be used by the electronic device 101. The different beamformer patterns 607. 609, 611. 613 that are available can be determined by the number of microphones 107 within the electronic device 101 and the relative position of those microphones 107.

In some examples the beamformer patterns 607. 609, 611. 613 can be used to determine the sound energy within a given direction and so provide an estimate of the locations of the sound sources 603. The sound energy in a given direction can be measured by summing the energy of a beamformed signal where the look direction of the beamformer corresponds to the direction. Other methods for estimating the sound energy in a given direction can be used in other examples of the disclosure. For example, direction of arrival analysis of the sound signals or any other suitable processes can be used.

The different beamformer patterns 607. 609, 611. 613 can be used to amplify or attenuate the sound sources 603, 605 as appropriate. For example, different gains can be applied to the different beamformer patterns 607. 609, 611. 613 based on the look directions of the beamformer patterns 607. 609, 611. 613 and the positions of the wanted and unwanted sound sources 603, 605.

Figure 7A:
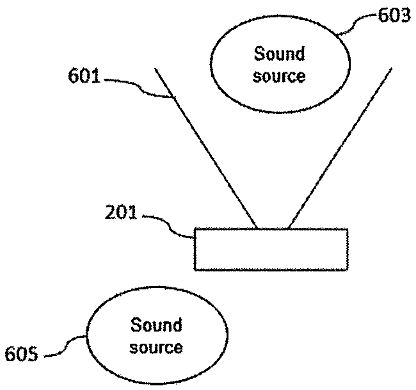
FIGS. 7A to 7C show example sound sources and signals.
Figure 7B:
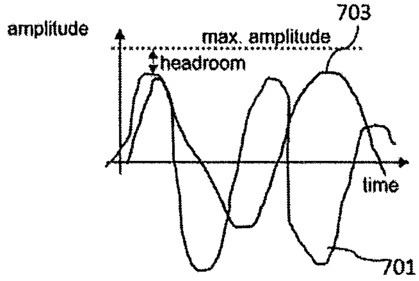
Figure 7C:
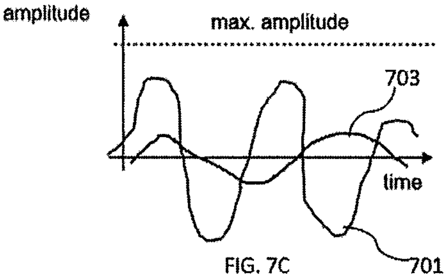

FIGS. 7A to 7C show example sound sources 603, 605 and signals 701, 702.

FIG. 7A shows the positions of the sound sources 603, 605 relative to the electronic device 101. In this example the first sound source 603 is located within the region of interest 601 and so is a wanted sound source. The second sound source 605 is located outside of the region of interest 601 and so is an unwanted sound source.

In the example of FIG. 7A the first sound source 603 and the second sound source 605 have the same, or substantially the same loudness. This means that the sound energy in the wanted direction is the same as, or approximately the same as, the sound energy in the unwanted direction. Therefore, when the methods shown in FIGS. 3 to 5 are implemented, it will be determined that the sound energy in the first direction is not larger than the sound energy in the second direction by at least the threshold amount.

FIG. 7B shows the audio signals after ACG has been applied but before any zooming of the signals. This shows a first signal 701 corresponding to the first sound source 603 and a second signal 703 corresponding to the second sound source 605. This shows that the first signal 701 and the second signal 703 have the same, or approximately the same, amplitudes.

In this example only a small amount of headroom is provided because the audio zooming can be implemented using attenuation of the unwanted sound source 605. This maximizes, or substantially maximizes, the loudness of the audio signal 701.

FIG. 7C shows the audio signals after zooming has been applied. In this example the zooming is applied by attenuating the unwanted sound source 605 relative to the wanted sound source 603. In the example of FIG. 7C the first signal 701 has a larger amplitude than the second signal 703. In the example of FIG. 7C the amplitude of the first signal 701 has not changed compared to the example of FIG. 7B however the amplitude of the second signal 703 has decreased. This effectively amplifies the wanted sound source 603 compared to the unwanted sound source 605. This attenuation does not need to use very much headroom available but does provide for an audio difference that is clearly perceptible to a user.

Figure 8A:
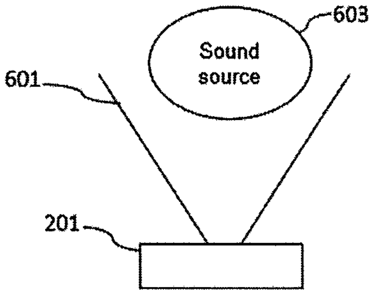
FIGS. 8A to 8C show example sound sources and signals.
Figure 8B:
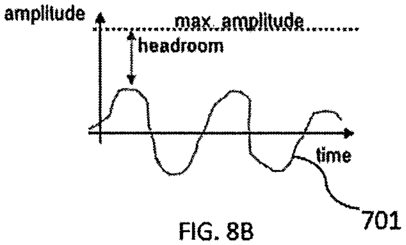
Figure 8C:
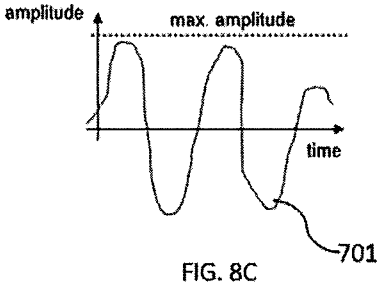

FIGS. 8A to 8C show another arrangement of example sound sources 603 and the corresponding signals.

FIG. 8A shows the positions of the sound source 603 relative to the electronic device 101. In this example only one sound source 603 is present. The sound source 603 is located within the region of interest 601 and so is a wanted sound source. In this example there are no unwanted sound sources. This means that the sound energy in the wanted direction is higher than the sound energy in the unwanted directions. In this example the sound source 603 is loud enough so that the sound energy in the wanted direction is higher than the sound energy in the unwanted directions by at least a threshold amount.

FIG. 8B shows the audio signals after ACG has been applied but before any zooming of the signals. This shows a first signal 701 corresponding to the sound source 603.

In this example a large amount of headroom is provided because the audio zooming can be implemented using amplification of the wanted sound source 603. Therefore, the audio file needs to comprise sufficient headroom to enable the amplification.

FIG. 8C shows the audio signal 701 after zooming has been applied. In this example the zooming is applied by amplification. In the example of FIG. 8C the amplitude of the audio signal 701 has increased compared to the example of FIG. 8B. This significant change in the amplitude of the signals provides a clear change in audio that can be perceived by a user listening to the audio.

Figure 9A:
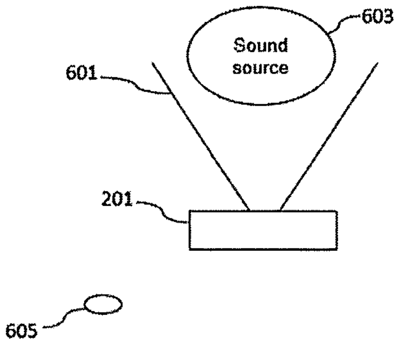
FIGS. 9A to 9C show example sound sources and signals.
Figure 9B:
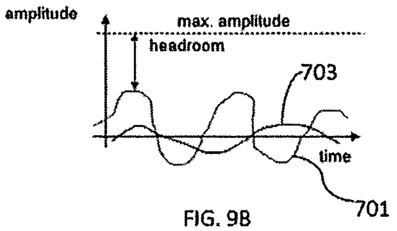
Figure 9C:
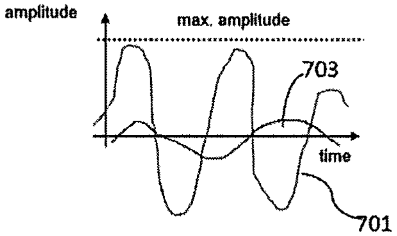

FIGS. 9A to 9C show another arrangement of example sound sources 603 and the corresponding signals.

FIG. 9A shows the positions of the sound sources 603, 605 relative to the electronic device 101. In this example a first sound source 603 is located within the region of interest 601 and so is a wanted sound source. A second sound source 605 is located outside of the region of interest 601. The second sound source 605 is therefore an unwanted sound source.

In the example of FIG. 9A the first sound source 603 is much louder than the second sound source 605. This is shown by the second sound source 605 being much smaller than the first sound source 603. In this case it will be determined that the sound energy in the first direction is larger than the sound energy in the second direction by at least the threshold amount.

FIG. 9B shows the audio signals after ACG has been applied but before any zooming of the signals. This shows a first signal 701 corresponding to the first sound source 603 and a second signal 703 corresponding to the second sound source 605. This shows that the first signal 701 has a larger amplitude than the second signal 703.

In this example a large amount of headroom is provided because the audio zooming can be implemented using amplification of the wanted sound source 603. Therefore, the audio file needs to comprise sufficient headroom to enable the amplification.

FIG. 9C shows the audio signals after zooming has been applied. In this example the zooming is applied by amplification. In the example of FIG. 9C the amplitude of the audio signal 701 has increased compared to the example of FIG. 9B. In this example the overall level can also be increased. This significant change in the amplitude of the signals provides a clear change in audio that can be perceived by a user listening to the audio.

Variations to the above described examples can be used in implementations of the disclosure. For instance, in some examples processes other than ACG can be used to control the loudness of the audio signals and the amount of headroom provided. For instance, in some examples compression of the audio signal can be used to control the loudness of the audio signals and the amount of headroom provided.

The compression can comprise using different compression curves. The compression can be used with a gain factor so that the more compression is sued the more the audio signal can be amplified without clipping. In some examples the compression could comprise multiband compression which could comprise using different compression in different frequency bands.

The compression curve that is used can be dependent upon whether or not audio zooming is selected.

The audio zooming might be more effective in some frequency bands than others. In such examples multiband compression could be used and the compression curve might only be dependent upon whether or not audio zooming is selected for the frequencies that are affected by the audio zooming.

The different compressions curves can be used to control the amount of headroom and may also be used to adjust the amount of headroom that is needed. The different compression curves could be used together with ACG and/or any other suitable processes.

Also in the above described examples the headroom is controlled to provide either a lot of headroom or a small amount of headroom. In some examples the headroom provided could be in between these two extremes. For example, if it is determined that the relative sound energies in a sound environment are changing then the amount of headroom provided could be changed to take this into account. The amount of headroom provided could be changed gradually to avoid a sudden switch between the two extremes. Therefore, for a time period over which the gradual change is taking place, the headroom provided could be in between the maximum and minimum amounts.

Therefore, examples of the disclosure control the amount of headroom provided based on whether dominants sounds are unwanted sounds or wanted sounds. This can enable audio zooming to be used while using the headroom available within the audio file to maximizing, or substantially maximizing, the loudness of the audio signals. The examples of the disclosure reduce audio clipping by ensuring that there is always sufficient headroom available for audio zooming.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

at least one processor, and at least one memory including computer program code, the at least one memory and the computer program code configured to, with the at least one processor, cause the apparatus at least to:

determine, for an audio signal, whether sound energy in at least one first direction is different to sound energy in at least one second direction by at least a threshold amount; and control an amount of headroom provided based on whether or not sound energy in the at least one first direction is different to the sound energy in the at least one second direction by at least the threshold amount, wherein the controlled amount of headroom is provided for activating of audio zooming.

2. The apparatus as claimed in claim 1, wherein the at least one first direction is within a region of interest and the at least one second direction is outside of the region of interest.

3. The apparatus as claimed in claim 1, wherein when the sound energy in the at least one second direction is not different to the sound energy in the at least one first direction by at least the threshold amount, the at least one memory and the computer program code are configured to, with the at least one processor, cause the apparatus at least to:

control the amount of headroom to be large enough for activating of amplification of the audio signal when the audio zooming is selected.

4. The apparatus as claimed in claim 1, wherein when the sound energy in the at least one second direction is different to the sound energy in the at least one first direction by at least the threshold amount, the at least one memory and the computer program code are configured to, with the at least one processor, cause the apparatus at least to:

control the amount of headroom to not be large enough for activating of amplification of the audio signal when the audio zooming is selected.

5. The apparatus as claimed in claim 4, wherein when the headroom provided is not large enough for the activating of amplification of the audio signal when the audio zooming is selected, the at least one memory and the computer program code are configured to, with the at least one processor, cause the apparatus at least to:

activate the audio zooming by attenuation of unwanted sound sources.

6. The apparatus as claimed in claim 1, wherein the at least one memory and the computer program code are configured to, with the at least one processor, cause the apparatus at least to:

detect a change in whether or not the sound energy in the at least one first direction is higher than the sound energy in the least one second direction by at least the threshold amount; and adjust the amount of headroom provided based on the detected change.

7. The apparatus as claimed in claim 1, wherein the at least one memory and the computer program code are configured to, with the at least one processor, cause the apparatus at least to:

control the amount of headroom provided in an audio file by at least one of:

using automatic gain control; or compression.

8. The apparatus as claimed in claim 1, wherein the sound energy in the at least one first direction or the sound energy in the at least one second direction is determined as a sum of a beamformed signal.

9. The apparatus as claimed in claim 1, wherein the at least one memory and the computer program code are configured to, with the at least one processor, cause the apparatus at least to determine, for the audio signal, whether the sound energy in the at least one first direction is higher than the sound energy in the at least one second direction by at least the threshold amount.

10. A method comprising:

determining, for an audio signal, whether sound energy in at least one first direction is different to sound energy in at least one second direction by at least a threshold amount; and controlling an amount of headroom provided based on whether or not sound energy in the at least one first direction is different to the sound energy in the at least one second direction by at least the threshold amount, wherein the controlled amount of headroom is provided for activating of audio zooming.

11. The method as claimed in claim 10, wherein the first direction is within a region of interest and the second direction is outside of the region of interest.

12. The method as claimed in claim 10, wherein in response to the sound energy in the at least one second direction not being different to the sound energy in the at least one first direction by at least the threshold amount, the amount of headroom is controlled to be large enough for activating of amplification of the audio signal when the audio zooming is selected.

13. The method as claimed in claim 10, where in response to the sound energy in the at least one second direction being different to the sound energy in the at least one first direction by at least the threshold amount, the amount 4 headroom is controlled to not be large enough for activating of amplification of the audio signal when the audio zooming is selected.

14. The method as claimed in claim 10, where in response to the headroom provided not being large enough for the activating of amplification of the audio signal when the audio zooming is selected, the method further comprises:

activating the audio zooming by attenuation of unwanted sound sources.

15. The method as claimed in claim 10, further comprising at least one of:

detecting a change in whether or not the sound energy in the at least one first direction is higher than the sound energy in the at least one second direction by at least the threshold amount; or adjusting the amount of headroom provided based on the detected change.

16. The method as claimed in claim 10, wherein the amount of headroom provided is controlled by at least one of:

using automatic gain control; or compression.

17. The method as claimed in claim 10, wherein the sound energy in the at least one first direction or the sound energy in the at least one second direction is determined as a sum of a beamformed signal.

18. The method as claimed in claim 10, wherein the method comprises determining, for the audio signal, whether the sound energy in the at least one first direction is higher than the sound energy in the at least one second direction by at least the threshold amount.

19. A non-transitory computer-readable medium comprising program instructions stored thereon for performing at least the following:

determining, for an audio signal, whether sound energy in at least one first direction is different to sound energy in at least one second direction by at least a threshold amount; and controlling an amount of headroom provided based on whether or not sound energy in the at least one first direction is different to the sound energy in the at least one second direction by at least the threshold amount, wherein the controlled amount of headroom is provided for activating of audio zooming.

20. The non-transitory computer-readable medium of claim 19, wherein the first direction is within a region of interest and the second direction is outside of the region of interest.

21. The non-transitory computer-readable medium of claim 19, wherein when the sound energy in the at least one second direction is not different to the sound energy in the at least one first direction by at least the threshold amount, the program instructions stored thereon are further for performing:

controlling the amount of headroom to be large enough for activating of amplification of the audio signal when the audio zooming is selected.

* * * * *